US005913344A

United States Patent [19]

Wronski et al.

[11] Patent Number: 5,913,344

[45] Date of Patent: Jun. 22, 1999

[54] PROCESS AND DEVICE FOR AUTOMATIC FILLING WITH PRODUCTS

[75] Inventors: Hans-Juergen Wronski, Rheinberg; Siegbert Schmidt, Moers, both of Germany

[73] Assignee: Messer Griesheim GmbH, Germany

[21] Appl. No.: 08/799,523

[22] Filed: Feb. 12, 1997

[30] Foreign Application Priority Data

Feb. 14, 1996 [DE] Germany .......................... 195 05 440

[51] Int. Cl.[6] .................................................... B65B 1/04

[52] U.S. Cl. ................................ 141/83; 141/4; 141/94

[58] Field of Search ................................ 141/83, 94, 4, 141/95

[56] References Cited

U.S. PATENT DOCUMENTS

| | | | |
|---|---|---|---|
| 4,657,055 | 4/1987 | Poulsen | 141/83 |
| 5,605,182 | 2/1997 | Oberrecht et al. | 141/351 |
| 5,738,153 | 4/1998 | Gerling et al. | 141/83 |

*Primary Examiner*—Steven O. Douglas
*Attorney, Agent, or Firm*—Connolly & Hutz

[57] ABSTRACT

A process for automatic filling with products, particularly of gas into gas cylinders, utilizes electronic comparison of the data stored in a data carrier located on the tank with the actually measured weight of the tank makes it possible to determine the degree of residual filling in the tank as well as to ascertain whether the tank weight is too low which, under certain circumstances, can give rise to safety risks and, in response, to either remove the tank from the filling process or else to fill it.

The process and the device function fully automatically, so that it is possible to save personnel costs.

17 Claims, 2 Drawing Sheets

1 2 3 4 5 6 7 8 9 10 11 12 13 14

PROCESS AND DEVICE FOR AUTOMATIC FILLING WITH PRODUCTS

BACKGROUND OF INVENTION

The present invention relates to a process for automatic filling with products, as well as to a device suitable for carrying out the process.

Whenever tanks are to be filled with defined amounts of a product, it is common practice according to state of the art to weigh the tank when it is empty in order to determine its tare and to subsequently fill it with a defined weight. This is done, for example, by placing the tank on scales and then filling it with the product while it is on the scales. This is also the technique employed for filling gas cylinders. When filling gas cylinders, it is also possible to first determine the tare and to subsequently carry out the filling operation while measuring the internal pressure in the cylinder. Once the desired final pressure has been reached, the cylinder is sealed and the filling procedure is completed. In some cases, the determination of the degree of residual filling—which must be carried out prior to any filling operation—can also be done by means of pressure measurement; this is particularly advisable if the residual gas is a gas like hydrogen, which has a low molecular weight.

With some filling operations, manometric and gravimetric determinations can be conducted in any conceivable combination in order to ascertain the degree of residual filling as well as the amount of gas that is filled in. This is particularly the case with gas mixtures which have highly varied properties in terms of the molecular weight of the gas.

A decisive factor during filling, especially when filling with gas, is that the gas cylinder to be filled must be in a state which is suitable for the storage, transportation and utilization of the gas contained in it. This is particularly relevant from a safety standpoint. Thus, corrosive gases which could damage the cylinder as the result of chemical reactions must not be filled into cylinders whose weight falls below a certain value laid down by safety specifications or into cylinders which are not approved for filling with the gas in question. In less extreme cases, it is sufficient for the cylinder to be filled at a lower pressure which does not give rise to any safety concerns. For this reason, nowadays the cylinders to be filled must undergo inspection by humans when they are filled or checked. For this purpose, the cylinders are placed on scales, their weight is determined and those cylinders whose tare deviates too much from the reference value are sorted out manually. As an alternative, a decision has to be made as to whether it might also be possible to fill the cylinders at a lower pressure in order not to have to completely remove them from circulation.

If the objective is to fully automate a filling process, certain requirements must be met in order to be able to dispense with the use of personnel. In a fully automatic device, it is only permissible to fill those cylinders which have a pre-defined weight and which are capable of receiving a likewise pre-defined filling weight. Precisely in the case of gas cylinders, however, it is not possible to ensure such constant preconditions, so that fluctuations in the tare of the cylinders do occur. This can be caused, for instance, by a residual content or by a reduction in the weight of the empty cylinders as the result of corrosion; here, in turn, the age as well as the number of previous filling operations with highly reactive gases play a role. These parameters, however, can vary considerably from cylinder to cylinder so that even in the case of automatic filling devices, it is first necessary to at least manually sort out the unusable cylinders.

SUMMARY OF THE INVENTION

In view of this, the invention has the objective of creating a process and a device with which it is possible to dispense with the use of personnel to inspect the condition of the gas cylinder or of the tank to be filled. Unusable cylinders should be automatically recognized and sorted out. Marginally useable cylinders should be recognized and the degree of filling should be adapted to the circumstances at hand. This process should take safety aspects into consideration.

With the process and the device according to the invention, it is now possible to fill tanks in a fully automatic manner while meeting safety requirements and also saving time and personnel.

THE DRAWINGS

The drawings depict in schematic form a device for the process according to the invention.

The following is shown:

FIG. 1 a device suitable for carrying out the process on the basis of a gravimetric method;

FIG. 2 a modification of the device on the basis of a manometric method.

DETAILED DESCRIPTION

Figure 1:
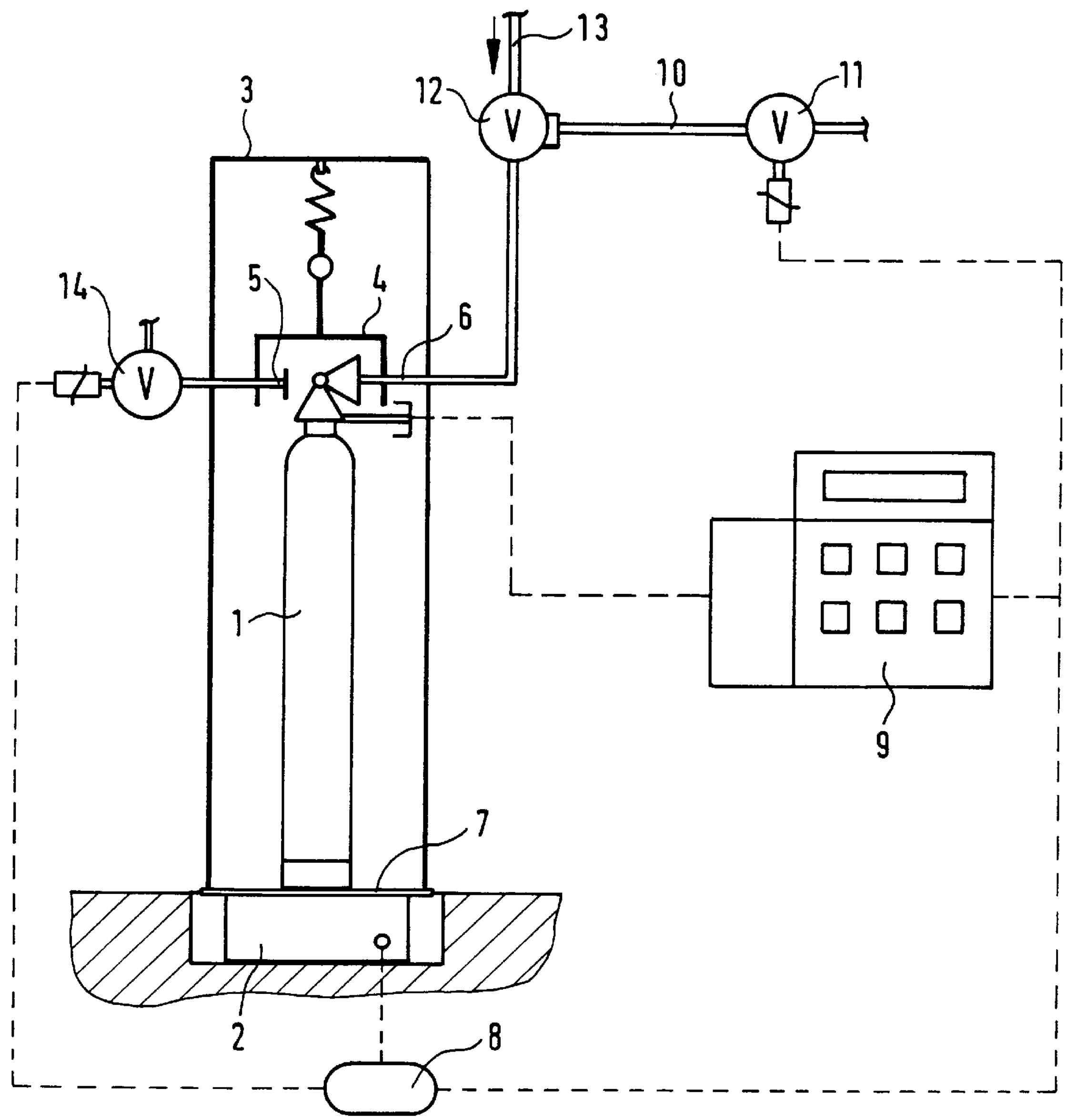

FIG. 1 shows a device that operates according to gravimetry, in which a gas cylinder 1 is standing on scales 2. The gas cylinder 1 is secured in place on the weighing platform 7 by means of a boom 3 which is firmly connected to a bracket 4 that holds a filling nozzle 5 as well as the gas connection piece 6. The scales 2 are connected to a measuring instrument 8 (weighing terminal) which is linked to a transponder 9 arranged on the gas cylinder 1, although in FIG. 1, this is indicated as being connected to the cylinder by means of a broken line. The transponder 9 and the measuring instrument 8 are, in turn, linked to a computer not shown in FIG. 1. The computer is connected to a solenoid valve 11. This valve is located in the compressed air line 10 that serves to actuate the valve 12 in the gas-feed line 13. The gas-feed line 13 is connected to the gas connection piece 6 for filling nozzle 5. The measuring instrument 8 is likewise connected with the filling nozzle 5 which is located upstream from a solenoid valve 14 that serves to regulate the compressed air.

Figure 2:
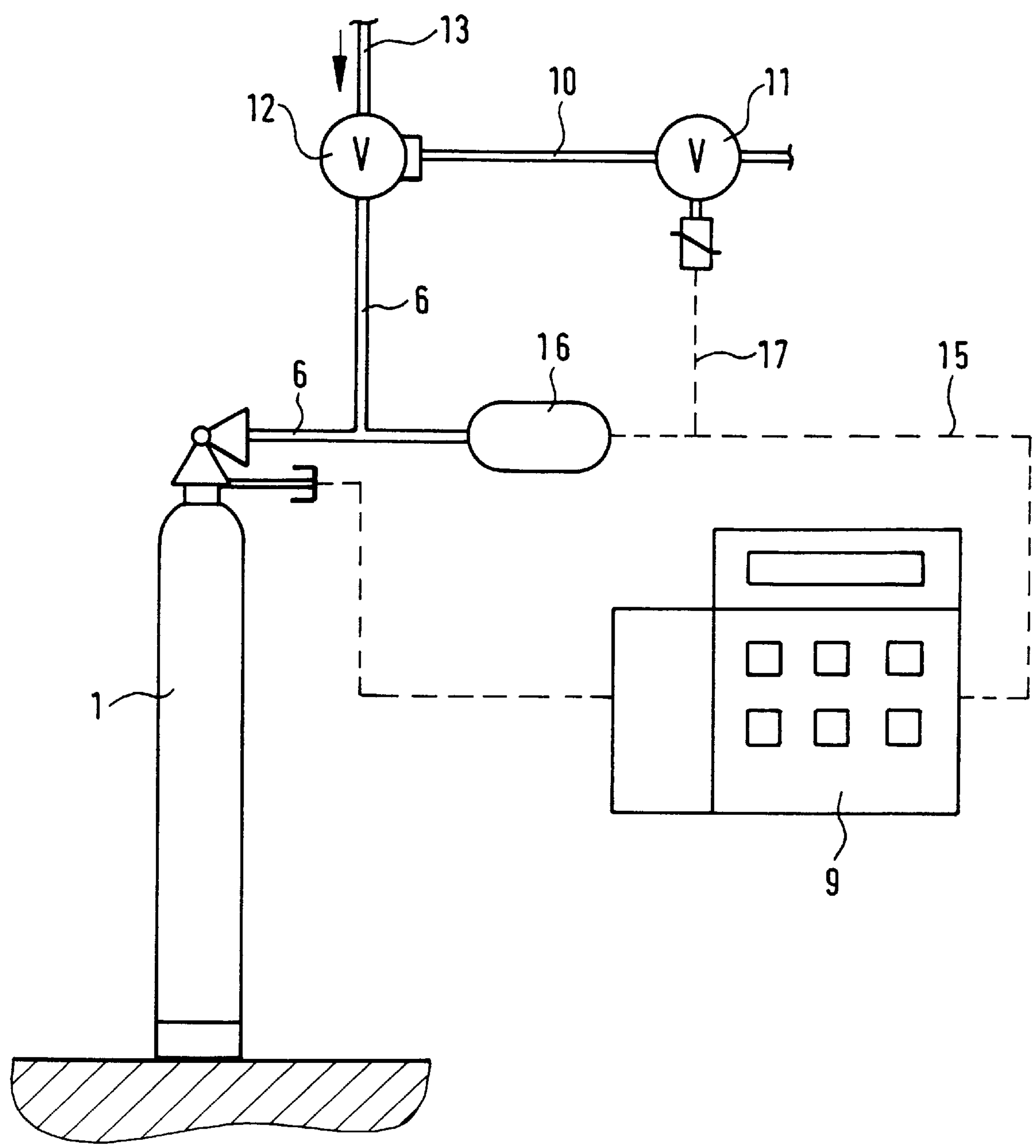

In FIG. 2, the same device features as in FIG. 1 are designated with the same reference numerals. FIG. 2 shows a gas cylinder 1 holding a transponder 9 that is connected via a line 15—indicated in the drawing by means of a broken line—to a pressure gauge 16 that picks up the momentary gas pressure via the gas connection piece 6. As was the case in FIG. 1, the transponder 9 is likewise linked to a computer (not shown in the drawing). The pressure gage 16 and the solenoid valve 11 are likewise connected to the computer. An additional line 17 branches off from line 15 and the former actuates the solenoid valve 11 of line 10.

During operation, the device shown in FIG. 1 functions fully automatically on a gravimetric basis. For this purpose, the gas cylinder 1 is placed on the weighing platform 7 of scales 2. This can be done by means of a loading robot which recognizes the gas cylinder 1 and correctly places it on the platform 7. This robot can also be employed to secure the head of the gas cylinder to the boom 3 by connecting or positioning the gas connection piece 6 and the filling nozzle 5. Bracket 4 ensures that the gas cylinders which are to be filled can be positioned in a reproducible manner, thereby avoiding weighing errors. The weight borne by platform 7 is determined by means of measuring instrument 8 and transmitted to the transponder 9 that is connected to a computer not shown in FIG. 1. The data pertaining to the tare of gas cylinder 1 stored in transponder 9 are compared to the momentary measured data coming from the measuring instrument 8. If the difference between the tare stored for gas cylinder 1 and the actually measured weight exceeds a value for gas cylinder 1 likewise stored in transponder 9, then the cylinder is removed from the filling procedure according to the process. This can be the case, for example, with a gas cylinder 1 intended for filling with corrosive gases. Depending on the age of the gas cylinder 1, different levels of corrosion damage might have occurred leading to a thinning or stripping of the cylinder wall. For safety reasons, these gas cylinders must either be removed from circulation altogether or else they can only be filled at a lower filling pressure. Once a gas cylinder 1 is no longer useable, the computer transmits a signal to the robot which, in response, removes the gas cylinder 1 from the scales 2 and positions the next gas cylinder 1 on the weighing platform 7. The computer either receives information on the net filling amount from transponder 9 or else it ascertains the weight increase on the basis of the stored data pertaining to the filling tank such as operating pressure, geometric volume and filling factor. If the comparison of the data stored in transponder 9 with the actual measured values indicates that filling is possible, and if the weight measured matches the tare stored in transponder 9, then the gas cylinder 1 is filled at the filling weight stored in transponder 9 for an intact gas cylinder 1. For this purpose, the filling nozzle 5 moves to the valve of gas cylinder 1 and triggers a signal that opens the solenoid valve 11. Compressed air then flows through compressed air line 10 and the air actuates the valve 12. This releases the gas-feed line 13 through which the gas to be filled flows into gas cylinder 1. Such a procedure can also be controlled, for example, by an electric drive rather than by compressed air. Once the calculated filling weight has been reached, which is ascertained by the measuring instrument 8 of the weighing terminal, the computer, in turn, actuates the solenoid valve 11 which blocks the gas-feed line 13, in this case, by means of the valve 12. If the computer detected a difference between the tare of gas cylinder 1 and the value ascertained by means of measuring instrument 8, and if this difference lies within a tolerance range which is stored as a limit value in transponder 9 or in the computer, then the computer calculates the permissible filling amount in each case as well as the appertaining total weight of the filled gas cylinder 1 and, in the same manner, it then releases the gas-feed line 13 for the filling procedure. In each case, the filled amount is entered as the momentary status in transponder 9. This is done in the form of the total weight and of the appertaining calculated weight increase resulting from the amount filled in. After completion of the filling operation, the gas cylinder 1 is sealed by the robot and the gas connection piece 6 as well as the filling nozzle 5 are taken off the gas cylinder 1. Subsequently, another gas cylinder 1 can be positioned for filling.

FIG. 2 shows a device which functions on a manometric basis. With this device, a pressure gauge 16, which is integrated in the gas-feed line 6, is connected to the process computer to which the transponder 9 is also linked. The gas cylinder 1 is first connected to the gas connection piece 6 of the gas-feed line, either manually or else automatically like with the gravimetric method. While valve 12 is closed, the gas pressure prevailing in the gas cylinder 1 can be measured by pressure gauge 16 prior to the start of the filling procedure. Analogous to the above-mentioned example, the momentary measured value is compared to the maximum permissible gas pressure in the gas cylinder 1—which is stored in transponder 9 as the initial pressure for the filling operation—and subsequently read by the transponder 9. If the internal pressure measured in the gas cylinder 1 exceeds the pressure value stored in transponder 9 as the maximum permissible value, then the gas cylinder 1 is removed from the filling operation. If the pressure measured lies below the maximum permissible limit, then the internal pressure measured in the gas cylinder 1 serves as the recognition value for releasing the filling operation. The computer, which is connected to the pressure gauge 16 and to the transponder 9, transmits a signal to the solenoid valve 11 which releases the filling of compressed air line 10 with compressed air that serves as the control medium for the valve 12. As a result, valve 12 is opened and the gas connection piece 6 is released for the gas flowing through the valve. During the entire filling procedure, the pressure prevailing in the gas cylinder 1 is measured by the pressure gauge 16, and the valve 12 is closed by the solenoid valve 11 actuated by the process computer connected to the measuring device 16 once the final pressure is reached. Once the final pressure stored in transponder 9 has been reached in the gas cylinder 1, the gas cylinder 1 is automatically sealed by a robot that can be controlled by the computer, or else it can also be sealed manually. The gas cylinder 1 is uncoupled from the gas connection piece 6 and the next gas cylinder 1 can then be positioned for filling. This embodiment of the process according to the invention is particularly advantageous when gas cylinders 1 are to be filled with medical gases such as anesthetic gases or NO in $N_2$ used in the treatment of pulmonary diseases; in such cases, the gas cylinders 1 to be filled must not contain any residual gas which could possibly have undergone chemical changes due to aging or which could contain secondary contamination.

Below, the filling procedure of a gas cylinder 1 with nitrous oxide (laughing gas) will be described, whereby an RF-transponder having a storage capacity of 1024 bits is employed as the programmable data carrier. The gas cylinders 1 used for this purpose, which have the same volume, differ markedly in terms of their tare. Laughing gas is a medical product and for this reason, there must be no residue—that is to say, laughing gas—left in the gas cylinder 1 in this case or any other gas that is not defined or whose chemical composition is divergent. Since $N_2O$ is a liquefied gas under pressure, an over-filled gas cylinder 1 would pose a major safety risk. The tare of such a pressurized gas tank can decrease, for example, due to corrosion. If the weight reduction that is permissible according to the German Technical Regulations on Gases (TRG) has been exceeded, the maximum filling pressure must be reduced in accordance with the rules or else the gas cylinder 1 has to be taken out of circulation.

As a preparation for the automatic gravimetric filling with laughing gas, RF-transponders (Radio Frequency transponders) are secured onto the gas cylinder 1 and programmed with the gas cylinder data. These data encompass, for instance, the embossed manufacturing number, company-specific designations for the tank, product and safety, the volume, the test pressure, the date for the next inspection (conducted by the German Technical Control Board-TÜV) as well as the tare of the pressure tank, that is to say, the gas cylinder 1. The data carrier remains on the tank. In view of this, it is largely possible to gather the data one single time. For the filling operation, the gas cylinder 1 thus fitted is placed on the scales 2 connected to the computer. The scales 2 read out information to the RF-transponder via the computer and ascertain the actual tare of the gas cylinder 1 by weighing it. If, for instance, the wrong tank or product designation is stored, or if the next T ÜV inspection is due or if the stored tare differs markedly from the weight actually measured, the gas cylinder 1 is not filled. If the gas cylinder 1 is suitable for being filled with laughing gas, the computer calculates the filling amount or the final weight on the basis of the tank volume and the so-called filling factor, which is dependent on the test pressure. The filling procedure is carried out until the final weight or the net weight has been reached. Subsequently, the computer programs the transponder of gas cylinder 1; for instance, the filling amount and batch number are written on the data carrier. Because of the readable data carrier, it is possible to recognize a change of the owner or of the type of gas in the gas cylinders if these data have been stored. Overfilling of the gas cylinders can be prevented by controlling the filling operation by means of weighing or by measuring the pressure. All communication between the filling device, the data carrier, the scales 2 and the pressure gauge takes place automatically. The filling operation also transpires fully automatically when the tanks to be filled have differing tares, that is to say, if they are of different sizes, for example. The filling procedure is also automatically refused, for instance, if a tank is identified as unsuitable due to excessive deviation from the specified weight or due to excessive residual pressure. It is possible to store the current filling data back onto the data carrier by means of scale-regulated or pressure-regulated filling control. The process and the device according to the invention can be employed to fill a wide array of products. Thus, gases such as $N_2$, $O_2$, Ar, Kr as well as gas mixtures consisting of gases or of gases with vapors, liquefied gases under pressure as well as liquids such as, for example, ammonia, chlorine, hydrogen chloride, nitrogen dioxide, sulfur tetrafluoride, $SF_6$, $CO_2$, nitrous oxide, hydrocarbons, chlorinated and fluorinated hydrocarbons can all be filled into pressurized gas tanks. It is also possible to fill containers or tank cars with solids such as granulates, chemicals of all kinds as well as fertilizers or liquids. As examples of packaging to be filled, mention can be made of pressurized gas cylinders in welded metal form made of aluminum, light-, heavy- or stainless steel, also cartridges, drums, canisters and plastic containers of all kinds. Even filling processes which are critical from a safety standpoint can be automated. The data carrier can also store all data necessary for the transportation (compliance with transportation regulations), data on occupational safety (toxicity), data on environmental protection, quality assurance as well as data employed for logistics and processing of orders.

The use of the process according to the invention is not restricted to the filling of gas cylinders with only one gas component. On the contrary, it is also possible to fill several types of gas into one gas cylinder 1. For this purpose, instead of the gas-feed line 13, a series of several feed lines, each with appropriate valves that can be actuated, can be configured on the gas connection piece 6. Its utilization is not limited to the purely manometric or gravimetric forms of the process either. Rather, it is also possible employ a process and a device in which, as a function of certain marginal conditions, a combination of the manometric and gravimetric methods is used. This is the case, for example, when gas mixtures consisting of components having very different densities or very different molecular weights are to be metered into the gas cylinder 1, whereby some of these mixtures can be ascertained by gravimetry very well such as, for instance, $SF_6$ while others are more suitable for quantity-based measurement by means of pressure gauges such as, for example, $H_2$. In such a case, the transponder 9 of gas cylinder 1 is connected to a computer which is supplied by the scales 2 as well as by a pressure gauge 16 with all the measured data needed to control the entire installation. The transponder 9 can be provided with a wide array of information. Thus, it can store data on the tare and volume of the tank to be filled, the type of tank, the maximum filling amount, the suitability of certain gas fillings, the batch number, the gas composition of the filling contents, also information for consumers such as the valves to be used or dates of expiration as well as information on parameters that are relevant for the TÜV. It is also possible to program the data carriers with data that make it possible to ascertain the type and size of tank, as a result of which the computer is capable of precisely securing the tank in place on the scales or in the filling device. This positioning or securing can be controlled fully automatically by the computer. RF-transponders are suitable as data storage elements. As an alternative, however, it is possible to employ bar codes which can be replaced after each filling operation. The use of the process and of the device according to the invention is not restricted to filling gas cylinders or pressurized gas tanks. Rather, any tank or any packaging can be filled with any desired product.

What is claimed is:

1. In a process for automatically filling a tank with products, in which a parameter selected from the group consisting of the weight and the internal pressure is measured in order to ascertain the degree of residual filling in the tank, and the tank is filled until a desired degree of filling—determined by measuring the parameter—is reached, the improvement being in that the tare data on the tank parameter selected from the group consisting of the tank weight and the maximum permissible internal pressure of the tank that is needed to ascertain the degree of filing of the tank is read from a programmable data storage element that is affixed to the tank, the values read are compared with the measured values and, on the basis of the calculated difference which is then compared to a limiting parameter selected from the group consisting of a maximum permissible difference and a minimum and a maximum value likewise stored in the programmable data storage element, the filling is carried out within the maximum permissible differential value until the permissible filling parameter selected from the group consisting of the filling weight and the permissible filling pressure has been reached, which is likewise read from the programmable data carrier.

2. Process according to claim 1, characterized in that the amount that is filled is the maximum permissible amount for that tank.

3. Process according to claim 1, characterized in that, if the maximum permissible differential value between the measured weight and the weight stored on the data carrier is exceeded, the tank is removed from the filling operation.

4. Process according to claim 1, characterized in that, if the maximum permissible residual pressure that is measured prior to the filling procedure is exceeded, the tank is removed from the filling operation.

5. Process according to claim 1, characterized in that, after the tank has been filled with the product, the total weight is measured and stored in the programmable data storage element.

6. Process according to claim 1, characterized in that the filling amount is calculated on the basis of the total weight and then stored in the programmable data storage element.

7. Process according to claim 1, characterized in that, after the filling operation, the filling pressure reached is measured and then stored in the programmable data storage element.

8. Process according to claim 1, characterized in that the size of the tank is recognized by reading out the tare and/or geometric volume stored in the programmable data storage element, as a result of which the device used for the filling operation is positioned in such a way that filling is possible, even if the size of the tank differs from the size of the tank that had previously been filled.

9. Process according to claim 1, characterized in that a transponder is employed as the programmable data storage element.

10. Process according to claim 1, characterized in that the tank is a gas cylinder and the product is a gas.

11. In a device having scales, a tank and a filling mechanism, the improvement being in that the tank is linked to an automatically readable data carrier in the form of a programmable data storage element affixed to the tank and the scales are linked to a transmitter that transmits weight data to a computer which is associated with the filling mechanism and which compares the data stored on the data carrier with the measured data transmitted by the scales to the computer.

12. Device according to claim 11, characterized in that the filling mechanism has a pressure gauge which is connected to the inner chamber of the tank to be filled and is also connected to a filling control.

13. Device according to claim 11, characterized in that a pressure gauge is employed to measure the pressure within the tank.

14. Device according to claim 11, characterized in that the programmable data carrier is a transponder.

15. Device according to claim 11, characterized in that the tank is a gas cylinder.

16. Device according to claim 11, characterized in that a gas is contained within the tank.

17. Device according to claim 16, characterized in that the gas is a liquefied gas under pressure.

* * * * *